Oct. 14, 1930.  P. M. JOYAL  1,778,422
TRAP FOR ICE FISHING
Filed March 12, 1928    2 Sheets-Sheet 1
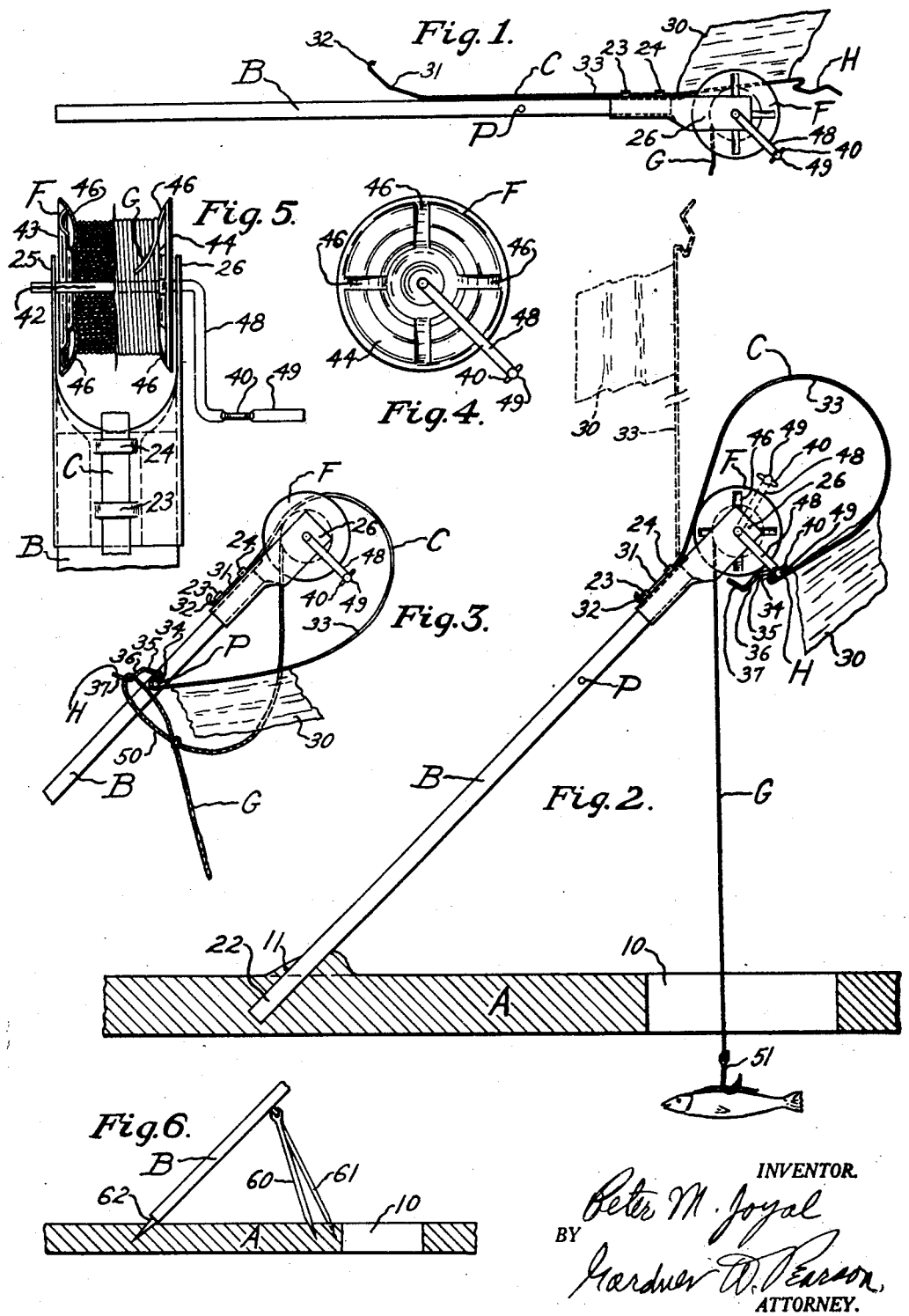

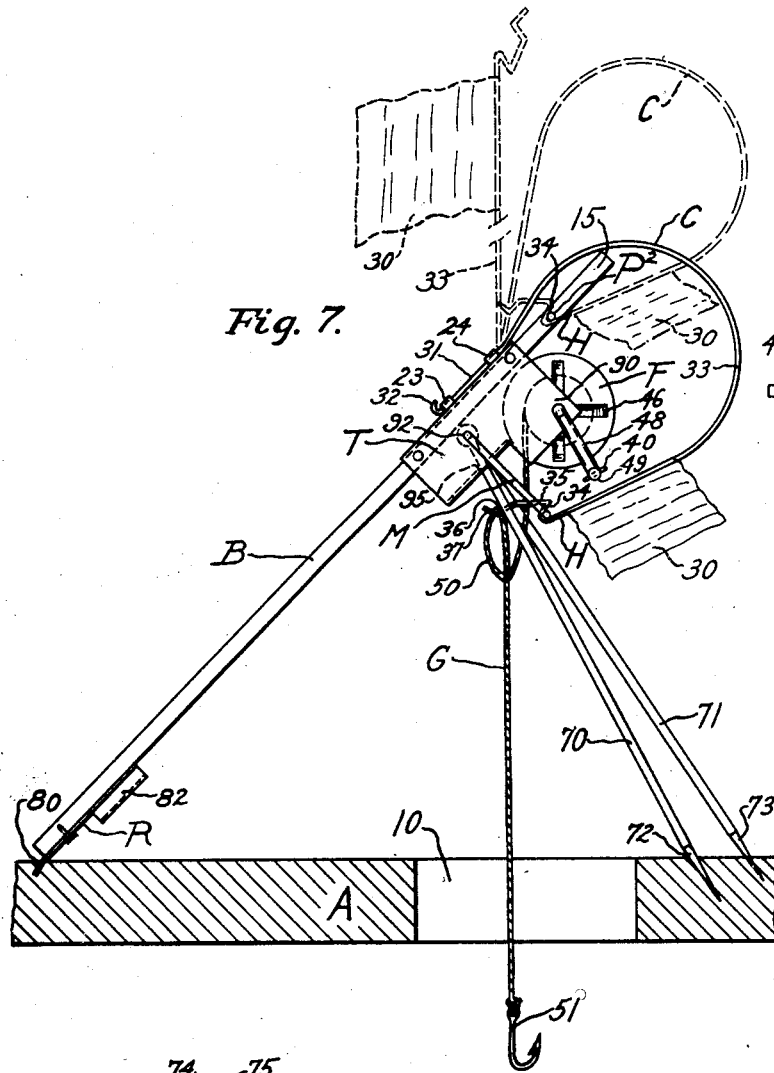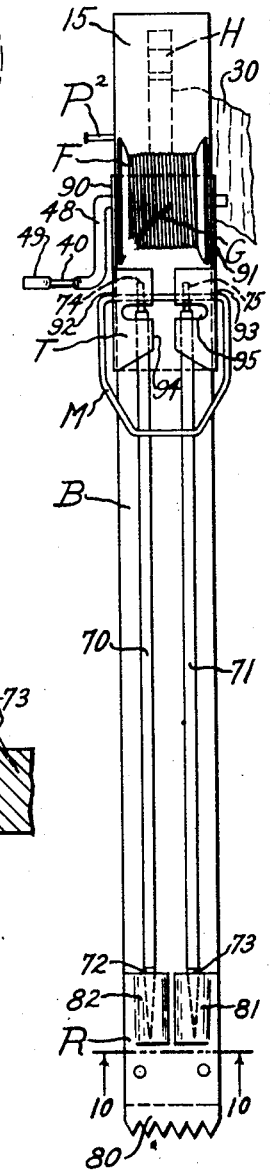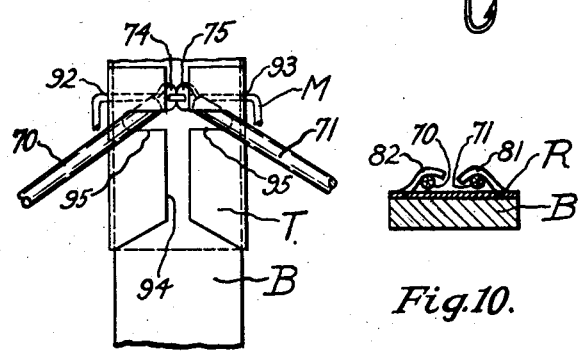

Patented Oct. 14, 1930

1,778,422

UNITED STATES PATENT OFFICE

PETER M. JOYAL, OF METHUEN, MASSACHUSETTS

TRAP FOR ICE FISHING

Application filed March 12, 1928. Serial No. 261,013.

This invention relates to what are known as fish traps such as are used in fishing through the ice.

Such traps usually include a body which is either frozen into a hole in the ice or held in position in some other way and include a flag signal of some sort which is held down by some kind of trigger arrangement connected with the fish line the end of which bearing the hook goes through a hole in the ice. When a fish bites the hook and pulls the line, the signal is released to a position where the fisherman can see it and it is generally desirable that a certain amount of line should be allowed to play out as the fish starts away, as otherwise the line is likely to be cut or broken.

In many traps the excess of line is merely coiled or dropped on the ice where it often freezes so that it will not run out when a fish is caught. Where a metal reel is used for the purpose of winding up the line instead of allowing it to be dropped on the ice, the line frequently freezes to the reel with the result that it may either not unwind at all, or may prevent the trap signal from working properly.

It is the purpose of my device to provide a very simple, compact and easily made trap with few working parts to get out of order or to so freeze that they will not operate. It is also my purpose to provide a trap with a reel having a handle whereby the line can be wound up for carrying or when set, but which will easily and surely unwind when a fish is caught.

In the drawings, Fig. 1 is a side elevation of my fish trap as it is packed for shipment or carrying.

Fig. 2 is a side elevation showing my device in position on the ice and with the catch of the elastic signal held by the handle of the reel.

Fig. 3 shows the upper end of the device with the catch caught over the catch pin instead of the reel handle.

Fig. 4 is an elevation from the back of my preferred type of reel.

Fig. 5 is an elevation of Fig. 4 from the side of the handle.

Fig. 6 is a small view showing my trap body supported on legs.

Fig. 7 is a view similar to Fig. 2 of a modification.

Fig. 8 is an elevation of the device shown in Fig. 7 with all the parts in folded position.

Fig. 9 is a detail of the device for holding the legs in position at the top.

Fig. 10 is a sectional view looking in the direction of the arrows on the line 10—10 of Fig. 8.

In the drawings, A represents ice through which a hole has been cut to admit the passage of the line G having at the end hook 51.

As shown in Fig. 2, the lower end 22 of the body B of my trap is imbedded and frozen into the hole 11 in ice A in a well known manner.

The body B preferably is a flat strip of wood and terminates at its upper end in the open fork comprising the two members 25 and 26 through which are suitable holes for the passage of the spindle 41 which carries reel F. Spindle 41 also is shown as integral with the handle 48 which terminates in the right angled arm 49 having a flat part 40.

As shown, this reel F includes a cylindrical barrel 42 and dished heads 43 and 44 from which are punched inwardly the radial ribs 46, 46, the purpose of which is to have only a few points of contact between the metal of the reel and the line G which is wound thereon.

The signal C is a flat elastic strip of metal which at one end 31 is substantially straight where it passes under the staples 23 and 24 driven into body B and ends in a stop 32 so as to prevent it from being pulled out of position. As shown in Fig. 1, this signal can be slipped down and will lie flat against body B for shipping and for carrying and when so housed, the signal strip engages the line on the reel F and serves as a brake to retard unwinding, as shown in Fig. 1. When used as shown in Fig. 3, it also serves as a brake when the trap is set.

Signal C has near its free end, a flag 30 and beyond this is a catch H which includes a reverse hook 34 the purpose of which is to hold the signal in position when hooked over catch pin P driven into the side of body B and beyond this extends the straight part 35, then the bend 36, and then a bend forming a line loop holder 37 for the loop 50 in line G as shown in Fig. 3.

The line is wound around reel F and as shown in Fig. 2, the hook 34 can be hooked on to the handle arm 49 preferably at 40 and will hold the signal down until the hook 51 is pulled whereby line G turns reel F and handle 49 to the dotted line position, in which position the catch H will slip out and release the flag 30 and signal C.

Instead of this manner of holding, the hook 34 can be hooked on to catch pin P and a loop 50 can be made in line G and hung over line loop holder 37. In this case, hook 34 is so made that a pull on line G from the hook end 51 will release hook 34 from pin P and operate the signal.

If desired, I may use a spike 62 on the lower end of body B and two foldable metal legs 60 and 61 to keep the device in position on the ice A without freezing it in.

When my device is equipped with folding legs, I prefer to make them as shown in Figs. 7, 8, 9, 10. Legs 70 and 71 are each pointed at their free ends 72, 73 and are flattened at their other ends 74, 75, which are pierced to allow wire loop M to pass through and serve as a loose pivot.

Instead of spike 62, I show a metal comb R fastened to the lower end of body A having teeth 80 and protectors 81 and 82 for points 72 and 73 when the legs are folded.

Instead of an open fork 25, 26, I use a reel casing T fixed back from the end 15 of body B. This reel casing has ears 90 and 91 between which reel F is journaled and is pierced at 92 and 93 for bail M. It also has a vertical receiving slot 94 and a locking slot 95 whereby legs 70 and 71 can be folded as in Fig. 8 or opened and spread and held in place as shown in Figs. 7 and 9.

I also show pin P² as being headed and driven in above the reel instead of below it. Hook 34 of catch H can be engaged either with handle 49 as before, or as shown by the full lines, with bail M, or as shown by the dotted lines, with pin P². In fact this catch can be engaged with any suitable projection connected with the trap body.

I claim:

1. In a trap for ice fishing, the combination of a body adapted at one end to be fixed in position on the ice and having at its other end a manually operable reel having a crank handle ending in an arm; with an elastic signal adapted to be bent and having a flag signal at its free end; and a catch integral with the free end of the signal including a reverse hook adapted to engage any suitable projection connected to said body and having a line loop holder.

2. In a trap for ice fishing, the combination of a body adapted at one end to be fixed in position on the ice and having at its other end a manually operable reel having a crank handle ending in an arm; with an elastic signal adapted to be bent; and a catch at the free end of the signal including a reverse hook adapted to engage any suitable projection connected to said body and having a line loop holder.

3. In a trap for ice fishing, the combination of a body adapted at one end to be fixed in position on the ice and having at its other end a manually operable reel having inwardly projecting radial ribs and a crank handle ending in an arm; with an elastic signal adapted to be bent; and a catch at the free end of the signal including a reverse hook adapted to engage any suitable projection connected to said body.

PETER M. JOYAL.